Aug. 30, 1938.  W. H. CHURCHILL  2,128,725
FASTENER INSTALLATION AND FASTENER FOR THE SAME
Filed Jan. 27, 1937
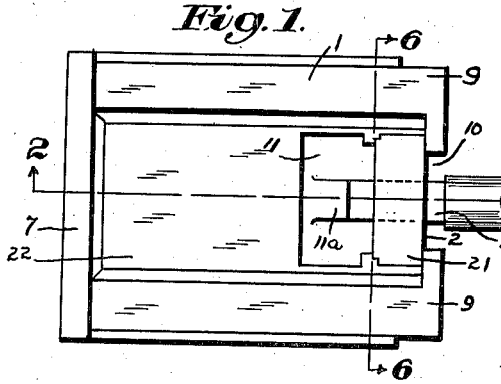
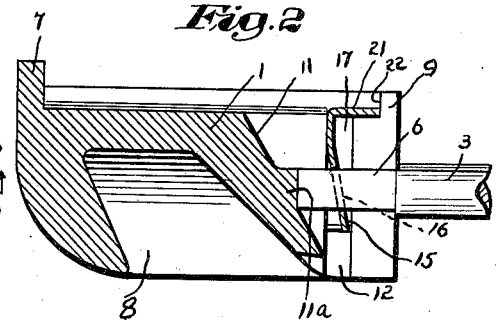
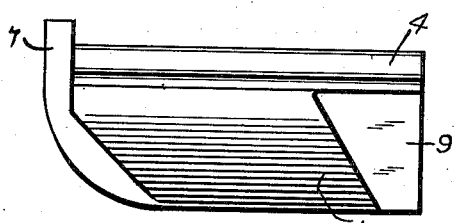
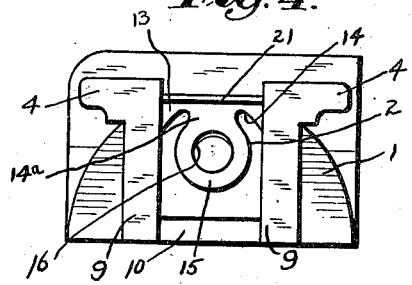
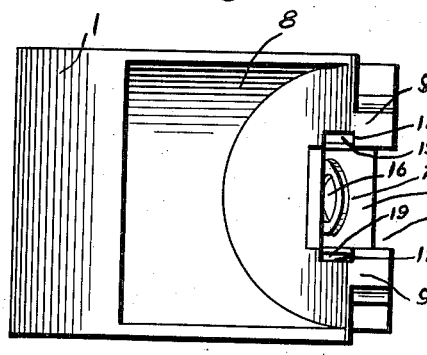
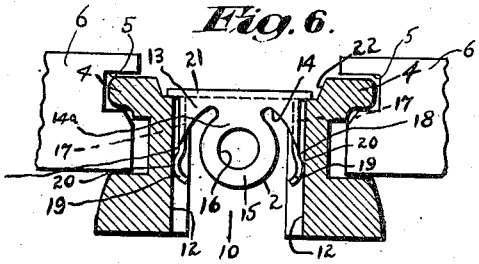
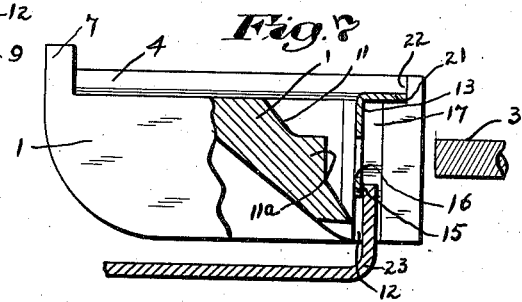
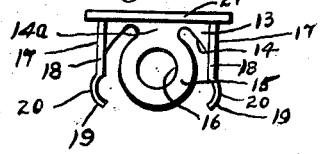
Inventor:
Wilmer H. Churchill.
by Walter S. Jones
Att'y.

Patented Aug. 30, 1938

2,128,725

UNITED STATES PATENT OFFICE 2,128,725

FASTENER INSTALLATION AND FASTENER FOR THE SAME

Wilmer H. Churchill, Saugus, Mass., assignor to United-Carr Fastener Corporation, Cambridge, Mass., a corporation of Massachusetts Application January 27, 1937, Serial No. 122,571

8 Claims. (Cl. 287—20)

My invention relates to fastening installations and fastener members for the same.

Referring to the drawing, in which I have illustrated a preferred form of my invention:—

Figure 1 is a top plan view of an article of manufacture secured to a rod member by means of my improved fastener member;

Fig. 2 is a section taken along the line 2—2 of Fig. 1;

Fig. 3 is an elevational view of an article of manufacture with my improved fastener member assembled therewith;

Fig. 4 is an end view of the installation shown in Fig. 3;

Fig. 5 is a bottom plan view of the installation shown in Figs. 3 and 4;

Fig. 6 is a section taken on the line 6—6 of Fig. 1 showing the method by which the knob member is assembled with a support;

Fig. 7 is a fragmentary section showing the knob member about to be secured to a rod member;

Fig. 8 is a bottom view of my fastener member per se; and

Fig. 9 is a front view of the fastener member shown in Fig. 8.

An object of my invention is to provide a simple and inexpensive fastener member adapted for quick and easily assembly with an article of manufacture for enabling a rod-like member to be secured to the article. For purposes of illustration I have chosen a knob member for use on automobile instrument panels, but it is understood that the specific knob member illustrated and described forms no part of my present invention other than in the manner in which the construction of the knob relates to the fastener installation herein set forth.

Referring to the drawing, the knob member 1, with which I have chosen to illustrate my invention, is of a type now commonly used on automobile panels. A fastener 2 is assembled with one end of the knob and has means by which a rod member 3 is easily secured to the knob. The rod 3 may be of a type commonly used in automobile manufacture for connecting parts of an automobile such, for example, as throttle and choke valves and electrical switches with a finger operative knob means disposed in operating position on the instrument panel. The knob 1 has ridge portions 4 extending along its longitudinal sides and adapted to cooperate with guide channels 5 formed as part of a panel 6 (Fig. 6) so that the knob 1 is slidably mounted relative to the panel. A stop means 7 is provided at the front face of the knob adapted to abut a face of the panel 6 for limiting movement of the knob in one direction relative to the channel and an undercut portion 8 is formed in the bottom of the knob (Figs. 2 and 5) providing a means by which the knob may be grasped by the fingers of an operator for moving the knob relative to the supporting panel.

As a means for assembling a fastener member with the knob 1 I have provided parallel spaced walls 9—9 at one end of the knob. The walls 9—9 define an opening 10 extending between the walls 9—9 from an inclined surface 11 at that end of the body portion of the knob from which the walls 9—9 extend, as most clearly shown in Figs. 1, 2 and 7. Grooves 12 are formed in opposed inner surfaces of the walls 9—9 (Figs. 5 and 6) for receiving attaching means of the fastener member 2 so as to secure the fastener member in firm assembly with the knob. Each of the grooves 12 has an open end at the top of the knob so that the fastener member 2 may be engaged with the knob by a longitudinal approaching movement, as will be hereinafter more fully described.

My preferred form of fastener member, shown most clearly in Figs. 6, 8 and 9 of the drawing, is formed of one piece of sheet metal. The fastener member has a base portion 13 having straight edges on three sides and a curved edge 14 on a fourth side. A spring plate portion 15, joined to the edge 14 by a connecting portion 14$^a$, is disposed beneath the edge normally in inclined relation to the plane of the base. The plate 15 has an aperture 16 for receiving an end of the connecting rod 3. For proper operation of my fastening device the area of the aperture 16 should be no greater than is necessary for allowing an end of the rod 3 to pass therethrough, as will be hereinafter more fully described. As a means for attaching my fastener member to the knob, I have provided leg portions 17 on opposed straight edges of the base 13, each of the legs being disposed with its flat surface in substantially perpendicular relation to the plane of the base. Each of the legs has a portion integral with the material of the base and a yieldable portion 18 extending beyond the curved edge 14. The portions 18 have inwardly bent free end portions 19 for facilitating entrance of the legs into the open end of the grooves 12 during attachment of the fastener to the knob. Each of the yieldable portions 18 has a shoulder 20 on its outer surface, the shoulders being constructed in such a way that the distance between their outermost points is greater than the distance between opposed faces of the grooves 12. A wing 21, formed integral with the straight edge of the base 13 opposite the edge 14, extends in substantially perpendicular relation to the base on the same side of the base as the legs 17.

In assembling the parts of my installation together, I first move the fastener member 2 toward the knob so that the inwardly turned free ends 19 of the fastener legs enter open ends of the grooves 12 at the top of the fastener. Then pressure is exerted upon the fastener so as to force the legs into the grooves 12 until the flange 21 abuts the material of the walls 7 adjacent a recess 22 cut into the body portion of the knob 1 and the side walls 7, at which time the legs are in proper fixed position relative to the grooves. As a result of the fact that the relative distance between the shoulders 20 of the yieldable portions 18 is greater than the distance between opposed surfaces of the grooves 12, the yieldable portions contract during movement of the legs into the grooves and then expand after they have been finally seated in proper position so as to engage frictionally opposed surfaces of the grooves, as most clearly shown in Fig. 6. The fastener member is now seated in proper position with the spring plate portion 15 inclined relative to the vertical plane of the knob 1 in the direction of the rod 3.

The knob is secured to the rod in my preferred form by compressing the spring plate 15 by any suitable means such as a tool 23 (Fig. 7) so that the plate 15 is moved into a plane substantially perpendicular to the rod 3. The knob 1 is then moved along the channels 5 of the panel 6 in the direction of the knob 3 until the free end of the rod 3 has passed through the aperture 16 of the plate 15 into abutting relation with a face of a projection 11ᵃ extending from the inclined surface 11 of the body of the knob. When pressure upon the plate 15 is released, the plate expands toward normal inclined position through natural resiliency of the fastener so that the material adjacent to opposed sides of the aperture 16 engages the rod 3 in a spring grip to secure the parts in firm assembly (Fig. 2). It is understood that I do not wish to be limited to the specific method of assembling the parts which I have described above because it is apparent that the knob assembly might be engaged with the rod by other methods, such, for example, if the rod is relatively stationary as by omitting contraction of the spring by a tool means and simply moving the knob toward the free end of the rod 3 until the plate 15 abuts the free end of the rod and then continuing pressure upon the knob so that the rod contracts the spring 15 until the aperture 16 is in proper relation relative to the rod to permit the rod to pass through the aperture, at which time the spring will expand to grip the wall in the manner described in connection with my preferred method of assembly.

The knob 1 may be disengaged from the rod 3 by contracting the spring plate 15 by any suitable tool 23 so as to move the plate in the direction of the body portion of the knob so that the material of the plate adjacent to the aperture 16 is moved out of engagement with the material of the rod, at which time the knob may be completely separated from the rod by a direct axial pull. Although I have chosen to contract the spring 15 by means of a tool, I am aware that it is possible to provide other means of contracting the plate 15, such, for example, as by providing an extension (not shown) at the lower end of the plate 15 which is of sufficient length to permit it to be actuated by a finger of an operator for contracting the plate 15.

While I have illustrated and described a preferred form of my invention, I do not wish to be limited thereby because the scope of my invention is best defined by the following claims.

I claim:

1. A fastener installation comprising an article of manufacture having an opening, a fastener member assembled with said article, said fastener member having a base, legs integral with said base, each of said legs having a portion engaging the material of said article adjacent said opening for securing said fastener member to said article, an apertured spring plate portion integral with said base, said plate portion being in line with the opening of said article, and a rod-like member having a portion extending through the aperture of said plate portion, said rod-like member being engaged by the material of said plate portion adjacent said aperture for securing said rod-like member to said article.

2. A fastener installation comprising an article of manufacture having spaced walls at one end defining an opening, a fastener member assembled with said article between said walls, said fastener having a base portion, means integral with said base portion in frictional engagement with material of said walls for maintaining said fastener member in assembly with said article, means integral with said base portion engaging the top of said walls maintaining said fastener member in proper position relative to said walls, an apertured spring plate portion extending from said base in normally inclined relation thereto, said plate portion disposed within the opening defined by said walls, a rod-like member having a portion extending through the aperture of said plate portion, the material of said plate portion adjacent said aperture engaging said rod-like member under spring tension whereby said rod-like member is secured to said article.

3. A fastener installation comprising an article of manufacture having spaced parallel walls at one end defining an opening, a groove on the inner side of each of said walls whereby said grooves are in opposed relation one to another, a fastener member assembled with said article, said fastener member having a base portion, attaching means integral with said base portion disposed within said grooves, said attaching means having portions engaging the material of said walls adjacent said grooves whereby said fastener member is maintained in assembly with said article, an apertured spring plate portion integral with said base and normally extending in angular relation to the plane of said base, said plate portion disposed within the opening defined by said walls, and a rod-like member having a portion extending through the aperture of said plate portion, the material of said plate portion adjacent said aperture engaging said rod-like member under spring tension whereby said rod-like member is secured to said article.

4. A fastener installation comprising an article of manufacture having spaced parallel walls extending from one end defining an opening, each of said walls having a groove in the inner face thereof, said grooves being in opposed relationship one to another, a fastener member assembled between said walls, said fastener member having a base portion, flange means integral with opposed sides of said base portion, each of said flange means having a yieldable portion extending beyond said base portion, said yieldable portions disposed within said grooves and frictionally engaging the material of said walls adjacent said grooves whereby said fastener member is maintained in assembly with said article, a wing portion engaging material adjacent the top of said walls for fixing said fastener member in proper position relative to said walls, an apertured spring plate portion integral with said base and normally extending in angular relation to said base, said plate portion disposed within the opening defined by said walls, and a rod-like member having a portion extending through the aperture of said plate portion, the material of said plate portion adjacent said aperture engaging said rod-like member under spring tension whereby said rod-like member is secured to said article.

5. A fastener member for assembly with an article of manufacture, said fastener member comprising a base portion, an apertured spring plate portion integral with an outer edge of said base and normally in inclined relation to said base, leg portions on opposed sides of said base and a flange portion integral with an edge of said base and disposed on the other side of said base from said plate portion.

6. A fastener member for assembly with an article of manufacture, said fastener member comprising a base portion, an apertured spring plate portion integral with said base and normally in inclined relation to said base, and legs on opposed sides of said base, said legs being in substantially parallel relationship one to another, each of said legs having a portion integral with said base and a yieldable portion, said yieldable portion adapted to engage frictionally the material of said article for securing said fastener to said article.

7. A fastener member for assembly with an article of manufacture, said fastener member comprising a base portion, an apertured spring plate portion integral with said base and normally in inclined relation to said base, and legs on opposed sides of said base, each of said legs having a portion integral with said base and a yieldable shouldered attaching portion extending beyond said base, each of said legs having its flat surface disposed at substantially right-angular relation to the plane of said base, and a wing portion integral with said base, said wing having its flat surface disposed in substantially perpendicular relation to the plane of said legs.

8. A fastener installation comprising an article of manufacture having an opening, a fastener member assembled with said article, said fastener member having integral legs engaging the material of said article adjacent said opening and providing the only means securing said fastener member to said article, an apertured spring plate portion located in line with the opening of said article, and a rod-like member having a portion extending through the aperture of said plate portion, said rod-like member being engaged by the material of said plate portion adjacent to said aperture for securing said rod-like member to said article.

WILMER H. CHURCHILL.